(12) United States Patent
Rao et al.

(10) Patent No.: US 9,178,984 B1
(45) Date of Patent: *Nov. 3, 2015

(54) RECORDING A SIGNATURE ON A TOUCH SCREEN ENABLED WIRELESS PHONE AND MOBILE DEVICE WITH STYLUS AND SERVER

(71) Applicant: IP Holdings, Inc., Palo Alto, CA (US)

(72) Inventors: Sanjay K. Rao, Palo Alto, CA (US); Sunil K. Rao, Palo Alto, CA (US); Raman K. Rao, Palo Alto, CA (US)

(73) Assignee: IP Holdings, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,917

(22) Filed: Mar. 2, 2015

Related U.S. Application Data

(63) Continuation of application No. 14/328,655, filed on Jul. 10, 2014, now Pat. No. 8,977,323, which is a continuation of application No. 13/555,124, filed on Jul. 21, 2012, now Pat. No. 8,781,534, which is a continuation of application No. 10/878,666, filed on Jun. 28, 2004, which is a continuation of application No. 09/597,607, filed on Jun. 20, 2000, now Pat. No. 6,882,859.

(51) Int. Cl.
*H04M 1/00* (2006.01)
*H04B 1/38* (2015.01)
*H04M 1/725* (2006.01)
*H04W 12/06* (2009.01)
*G06K 9/00* (2006.01)

(52) U.S. Cl.
CPC ....... *H04M 1/72577* (2013.01); *G06K 9/00154* (2013.01); *H04W 12/06* (2013.01)

(58) Field of Classification Search
USPC .......................................... 455/566
See application file for complete search history.

(56) References Cited

U.S. PATENT DOCUMENTS 5,940,383 A * 8/1999 Willkie ............... H04L 12/6418
370/336
6,819,916 B1 * 11/2004 Griffith ................. H04W 8/265
379/112.01

* cited by examiner

*Primary Examiner* — Ankur Jain
(74) *Attorney, Agent, or Firm* — Levine Bagade Han LLP

(57) ABSTRACT

A cellular phone and mobile device is configured with the ability to accept a signature. A user may write a signature on a touch sensitive display of a mobile device using touch or a pen. A user may be further authenticated by using voice or password. Software for recognizing a finger print could reside on a network server or on the hand held device. Handwriting recognition can be used for authentication. The signature may be viewed on a second mobile device in real time. The signature may be synchronized with a server or an Internet device. The system may allow for multiple parties to sign an electronic document using mobile devices and Internet servers.

20 Claims, 3 Drawing Sheets

RECORDING A SIGNATURE ON A TOUCH SCREEN ENABLED WIRELESS PHONE AND MOBILE DEVICE WITH STYLUS AND SERVER

CROSS REFERENCE TO RELATED APPLICATIONS

The present application is a continuation of U.S. application Ser. No. 14/328,655, filed on Jul. 10, 2014, which is a continuation of Ser. No. 13/555,124 filed on Jul. 21, 2012, now U.S. Pat. No. 8,781,534 which is a continuation of U.S. application Ser. No. 10/878,666 filed Jun. 28, 2004, which is a continuation of U.S. application Ser. No. 09/597,607 filed Jun. 20, 2000, now U.S. Pat. No. 6,882,859; the disclosures of all the above patents and applications are herein incorporated by reference in their entirety.

BACKGROUND OF THE INVENTION

Currently the key pad buttons on a cellular telephone/mobile device (CT/MD) pose a limitation in inputting broad based queries. There are only 12 non-control buttons on many CT/MDs. Even where there are more, there are so few that inputting even as little as the letter-number ASCII set is not really practical. For example, in the present art there have been attempts to expand the number of keys, such as treating the numeric keys as numbers unless a code is entered, such as A*#@ or the like, then treating a A2" as an Aa@, A2-2" as a Ab@, and A2-2-2" as a Ac@. Entering A2" three times to form a Ac@ is both confusing and slow, and such approaches have not been popular. If a mixed string of letters and numbers are desired, the three A2"s may have to be delimited with, for example, A*#@, and the process becomes increasingly more unwieldy. There has been some success in using a computer, especially a computer operating with Afuzzy@ logic, to extract the probable combination of letters in a numeric string, exemplified by an interactive directory for finding the telephone extension number of an employee by Aspelling@ the employee's name on a numeric key pad. This is a satisfactory solution only in limited cases. Numeric reduction of this type has not been generally used except for telephone directories and similar purposes.

SUMMARY OF THE INVENTION

It is an object of the present invention to provide a scheme by which the limitations of a key pad are overcome and the key pad is enhanced. The scheme uses a local or network server.

The protocols for configuring each key to a specific function or variable set of functions are stored in a Server C. The protocols for all keys may be stored on Server C similarly. The menu for any macro function can be stored on this Server C. Server C may be part of a local loop or located on the internet.

In an embodiment of the present invention, displays, such as small LCD displays, are mounted on the top of the keys and connected to a matrix addressing system. When a key is reconfigured, such as from an English language AA@ to some Japanese character, the legend displayed on the key with the small display is changed accordingly.

In another embodiment of the present invention, the keyboard is displayed in the display window of a computing device, such as a hand held wireless device. The term wireless device includes entertainment/game machines. The screen of the wireless device is touch sensitive, so the user can type on the screen as if it were a standard keyboard.

In another embodiment of the present invention, the keyboard is displayed on a separate screen in the position of and replacing the keyboard on a device, such as a hand held wireless device. This screen is touch sensitive, so the user may type on it as if it were a keyboard.

In another embodiment of the present invention, the keys on any of the above keyboards, as well as on keyboards of the present invention generally, have a sound output, such as a voice output. In this way visually impaired or persons with similar concerns can listen to what keys are being depressed.

Other objects, features and advantages of the present invention will become apparent from the following detailed description when taken in conjunction with the accompanying drawings.

BRIEF DESCRIPTION OF THE SEVERAL VIEWS OF THE DRAWING

The accompanying drawings, being incorporated in and forming a part of this specification, illustrate embodiments of the invention and, together with the description, serve to explain the principles of the present invention.

DETAILED DESCRIPTION OF THE INVENTION

Figure 1:
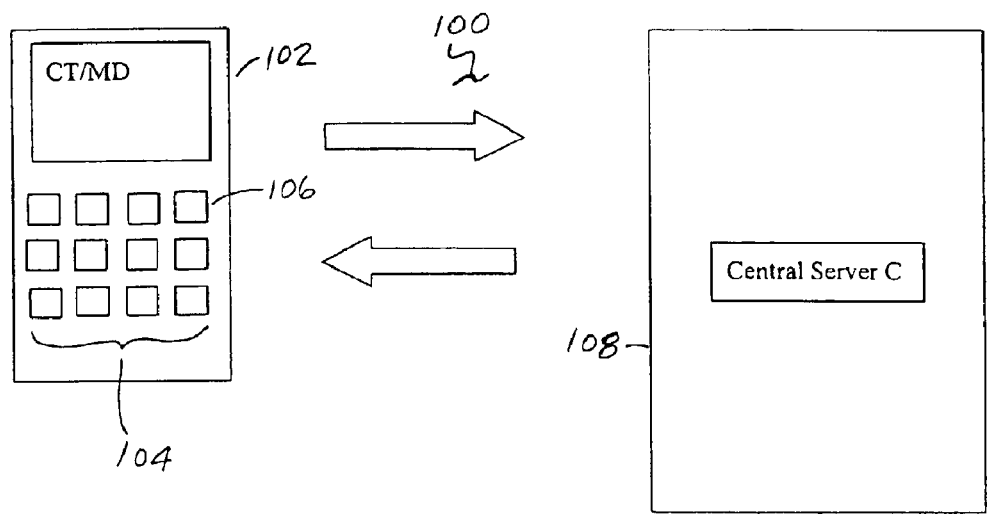
FIG. 1 is an embodiment of the present invention showing a CT/MD with a reconfigurable keyboard communicating with a Central Server C.

The present invention provides means for more easily and intuitively assigning, for example, key values to a wireless device such as to a key associated with the wireless device. The present invention also provides means for compressing or expanding the keys on an entry system such as a wireless device or wireless computing device to more efficiently provide keys needed for entry or other reasons, such as sound, in a desired space.

The present invention uses a Central Server C providing the software routines and other support for realizing the improved input key means for a wireless device or for a wireless computing device.

Thus the Server C contains a number of menus for different applications comprising of assigned values for each key function.

1. Individual Key→may take one or more values that are programmable.

2. Full set or subset of keys→may take one or more values that are programmable.

3. The individual or subset or full set of keys→is programmable to perform assigned functions.

4. The above individual or subset or full set of keys in combination may comprise a menu to perform various customizable functions.

5. The identity of each programmed value for a key, set of keys or full set of keys is stored in the Server C.

6. The menus, sub menus and individual key functions are stored in Server C and may be accessed for use by wired or wireless means. They can be dynamically changed as defined by the user=s needs.

7. The user may easily go from one set of functions or menus to another set of functions or menus by selecting an option from the CT/MD.

8. The menus or functions may coexist on the CT/MD. One function or menu may go to the background and one may be in the foreground. One set may be primary and the others secondary or a hierarchy of functions/menus may be maintained, such as with a windowing of templates, where the user may change templates in the same manner as changing windows on a personal computer (PC).

9. Server C manages the delivery of these functions to the CT/MD and also maintains a history.

10. This same process is extendible to pen based inputs where certain figures or icons or strokes may be designated to indicate certain functions or menus that we stored on the Server C and delivered as needed by a command from the CT/MD.

11. This same process is extendible to voice based input commands and output where each voice command or output means a certain function or a menu that is stored in Server C. The voice recognition function in addition may add more functionality to respond to a given voice. The voices may be in different languages.

12. The same process may be extendible to sounds rather than voice; for example, the sound of a bell.

In addition the CT/MD may contain electronics and process capability to internally store the various programmable key functions or menus such that different functions and menus may be chosen as the need arises.

In addition, the web server may be shrunk into a microchip that can be part of the internal electronics of the CT/MD, in which case a local or network server may or may not be needed. In this event the features described above for programming and describing each key or input/output could be handled by the internal web server independently or in conjunction with a local or network Server C.

If a user initiates communication with a particular device, i.e., if a user selects a particular device, the system may understand the context and may change the keypad automatically. Thus the system may perform context-aware keypad changes. This context may be based upon location, the devices communicated with, devices present in its local environment, or other factors FIG. 1 illustrates a wireless system 100 with a CT/MD 102 having a dynamically reconfigurable keypad 104. Such a keypad 104 provides the ability to define macro keys not included with the standard alphanumeric keypad. In FIG. 1, a CT/MD 102 which seems standard has display devices mounted on each key 106, so that the legend appearing on the key 106 is configurable in software such as from Central Server C 108 without requiring external physical changes.

Figure 2:
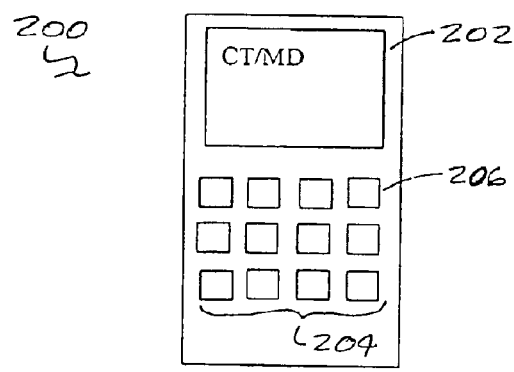
FIG. 2 is an embodiment of the present invention showing a CT/MD with display devices on the keys for defining the function of the key dynamically.

FIG. 2 illustrates a wireless device 200 such as a CT/MD having a display 202 and a key pad 204. The key pad 204 has keys such as key 206 which are assignable as desired in software.

The user may choose to reassign a key on the wireless device to represent a particular function. For example, the user could assign a key to serve as a garage door opener. The user may also use this functionality for universal language capability, such as to change an English keypad to serve as a Japanese keypad. The display mounted on the key may be used to change the keypad template, such as by introducing a Japanese character on the key replacing the English letter AA@ or a macro such as "open garage door".

Figure 3:
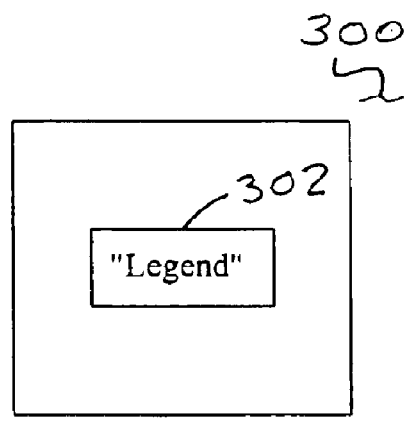
FIG. 3 is an embodiment of the present invention showing a key with a screen or display thereon for containing a legend.

FIG. 3 shows an embodiment of the present invention in the form of a key 300 such as a key that might be found on a multifunction keyboard. In FIG. 3, the key 300, such as a key from a multi-function keypad, is composed of a liquid crystal display (LCD) which can be modified with electrical inputs only. In this manner, as new templates are used, the key 300 will immediately reflect these changes. Thus, when a key 300 is reassigned a new name and function, the key=s new name can become apparent to the user as a legend 302 on the key 300 itself.

The LCD or similar display need not form a part of the key. A clear button made of, for example, plastic may encase a LCD type display which may or may not be touch sensitive; that is, a touch sensitive LCD. As new templates are loaded, the LCD display is modified to reflect these changes.

Figure 4:
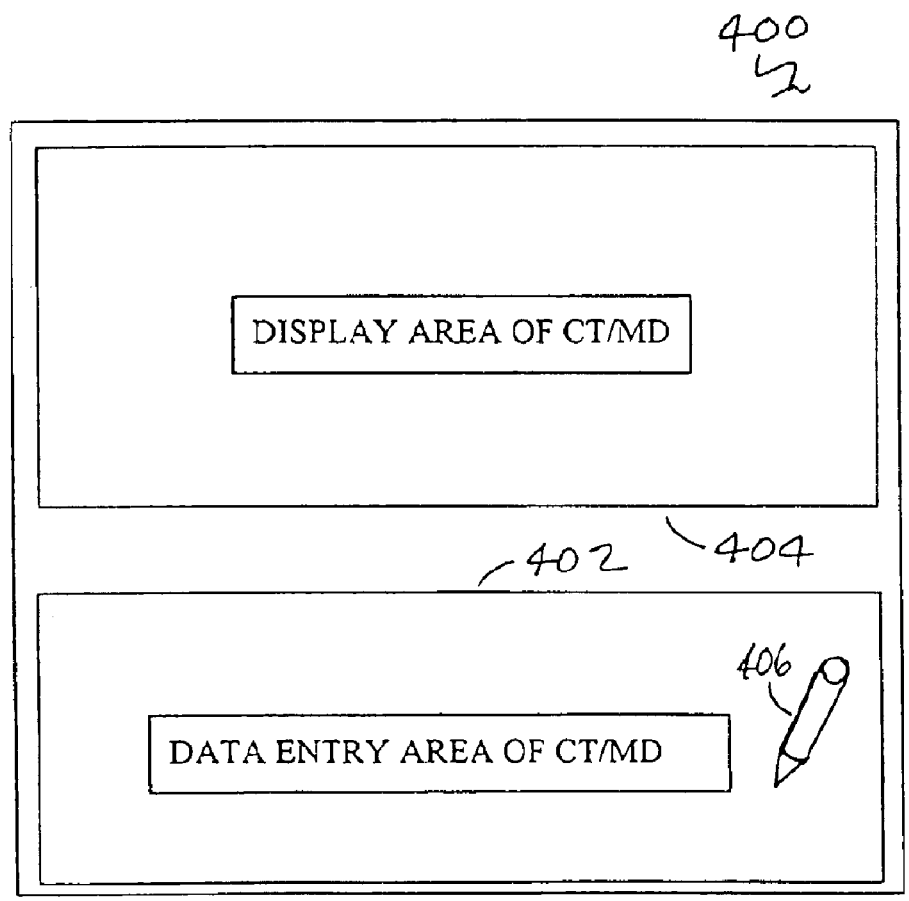
FIG. 4 is an embodiment of the present invention showing a wireless device having a screen for containing a keypad which is accessed by a pointer, such as a stylus.

FIG. 4 shows an embodiment of the present invention with a CT/MD 400. FIG. 4 shows the CT/MD 400 having a dynamic key pad 402 such as a touch sensitive LCD panel. The CT/MD 400 optionally includes a liquid crystal display (LCD) 404. If a writing area is present then new templates can be loaded with, for example, selectable icons, and a stylus 406 can be used to choose the various keys.

Server Based, Remote Handwriting Recognition.

Handwriting recognition may be processing intensive. Wireless devices may not have the processing capability to perform advanced handwriting recognition techniques within a reasonable time. The wireless devices can offload handwriting recognition functions to a central server. The server may then transmit the recognized characters back to the wireless device, such as screen 402.

This could serve also as a signature authentication or finger print authentication mechanism. A scanner could be used to perform finger print authentication. Such authentication could take place remotely on a Central Server C 108.

Figure 5:
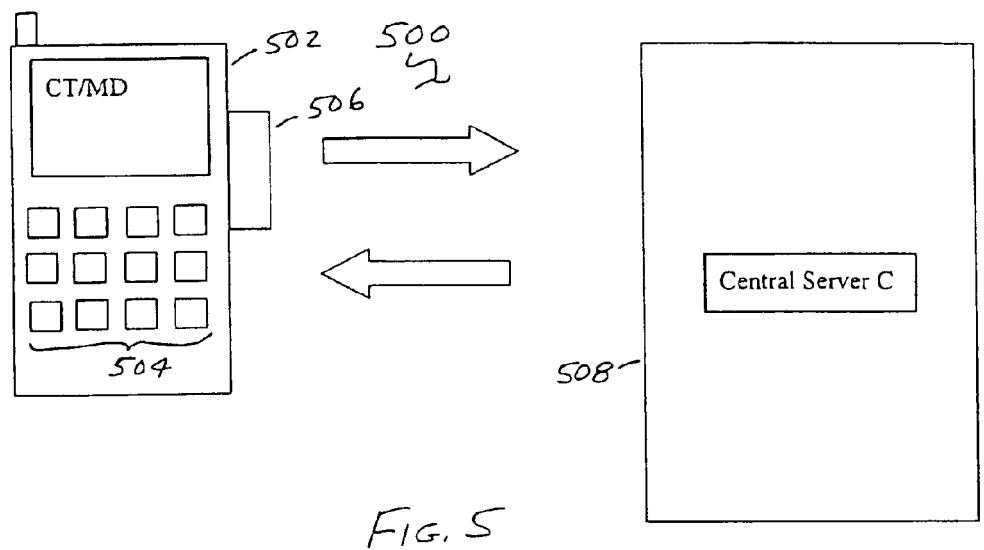
FIG. 5 is an embodiment of the present invention showing a wireless device having a microphone for allowing voice entries for language translation.

FIG. 5 illustrates a wireless system 500 which is an embodiment of the present invention. In FIG. 5, a wireless device 502 transmits an image of the text that has been captured from the writing area 504. This may be a bit map image or it could be in a standard format that both the wireless device 502 and Central Server C 508 understand.

The wireless device 502 establishes a wireless connection with the Central Server C 508 and transmits the image in a standard format. The Server C 508 then performs the processing on the image and converts it into a format of standard recognized characters which the wireless device 502 understands. The server 508 thus takes an image format of the inputted information and converts it into another format of known characters. After this processing is complete the server C 508 can then transmit the converted format back to the wireless device 502. The server C 508 could also perform language translation on the inputted information. A microphone 506 at the wireless device 502 accepts voice. Voice clips may be transferred to the server 508 and converted to text using voice recognition software at the server 508. Alternatively, language translation may be performed on the voice file for voice based language translation. After the server 508 has performed these processing steps, voice files or text may be sent back to the wireless device 502.

The system 500 can also be used for user authentication such as with finger print, eye print, or password authentication.

Authentication:

Additionally, the key pad 400/stylus 406 interface could be redefined so that a finger print could be taken for image authentication. This image would be used, for example, for user authentication. The software for recognizing a finger print could reside on a network server 508 or on the hand held device 502.

The present invention allows for handwriting recognition and can be used for authentication. The recognition software can be on the network server or on the hand held device. The present invention also allows for the person to speak to a cell phone/hand held device and access remote macros. For example, by stating Aopen garage@. This command could connect to a network server 508 which would then authenticate the voice. Since voice recognition could be burdensome, this operation could be performed on a networked server 508 or on the hand held device 502. Once the voice has been recognized through voice recognition software, the command will be performed.

Figure 6:
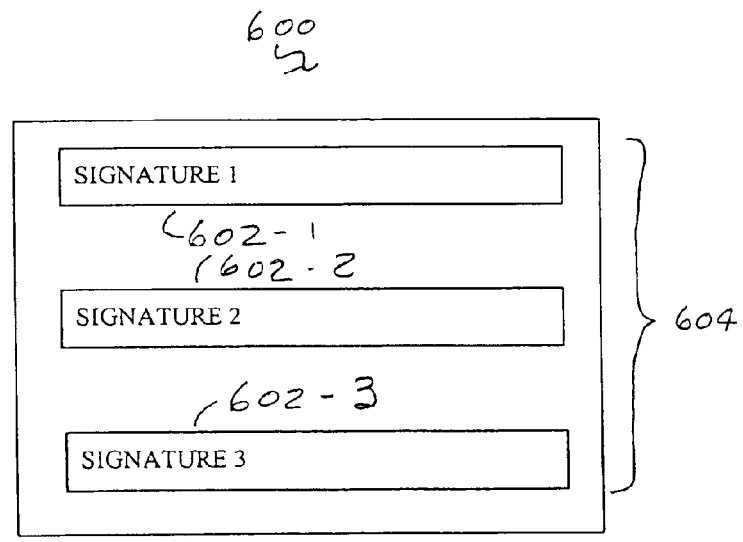
FIG. 6 is an embodiment of the present invention showing how users of the present invention who are physically separated can collaborate in a signing ceremony.

In FIG. 6, an embodiment of an input pad such as a touch sensitive screen 600 of another part of the invention allows for collaborating. The present invention allows screens such as screen 600 to be viewed interactively for interacting from separate devices. For example, if three screens such as screens 602-1, 602-2, 602-3 are used to sign a document from different places, signatures 602 can be on separate screens 600 and optionally displayed on other screens as well. Each screen can be watched separately, with signing being done in parallel or sequentially on the separate screens. This allows the signatures displayed on screens 602 to be placed on a virtual document 604 for interactive verification. Each signature displayed on screens 602 can have a different trust level. The escrow agent is Server C 508.

The present invention has been described with a number of features and advantages. For example, one embodiment of the present invention provides a keyboard device including a a plurality of configurable keys and a central server where the central server includes means for dynamically configuring a legend on a selected key from the configurable keys, means for detecting an actuation (selection) of the selected key with the legend, and means for associating the actuation of the selected key with the legend on the selected key. The central server could be remote or local to the keyboard device.

The keys in the keyboard typically could be LCDs for displaying the respective legends, and desirably are touch sensitive.

The keyboard device could be voice based, sound based or macro based, including key, sound or voice. The keyboard device could be wireless, such as a cellular telephone or mobile device. The keyboard device could be non-wireless.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention and its practical application, to thereby enable others skilled in the art to best utilize the present invention and various embodiments, with various modifications, as are suited to the particular use contemplated. It is intended that the scope of the invention be defined by the Claims appended hereto and their equivalents.

What is claimed is:

1. An electronic signature system using a server and a plurality of multifunction mobile devices, the system comprising:
 a server, wherein a portion of a display of a multifunction mobile device is configured to accept a signature,
 wherein the signature is entered by physical touch with the display,
 wherein a document displayed on the multifunction mobile device is further configured with a first signature entry location, a second signature entry location, a third signature entry location;
 wherein a first signature, a second signature, and a third signature are associated with and displayed on three multifunction mobile devices respectively; and
 wherein signing is done in parallel or sequentially on separate screens amongst the three multifunction mobile devices such that the signatures are placed on a virtual document for interactive verification;
 and wherein authentication is enabled by a finger print authentication mechanism.

2. The system of claim 1 further comprising an escrow server, wherein the escrow server is configured to receive said signatures from a first multifunction mobile device and a second multifunction mobile device.

3. The system of claim 1 wherein each of the signatures recorded by a first multifunction mobile device and a second multifunction mobile device are viewable simultaneously.

4. The system of claim 1, wherein each signature is used to sign a document in different places.

5. A system for recording one or more signatures, the system comprising:
 a server programmed to provide routines for use by a multifunction mobile device having one or more processors and a user input feature,
 wherein the server synchronizes signatures,
 wherein the server is in communication with the multifunction mobile device such that the server is programmed to receive a first signature recorded in a first signature entry location of the multifunction mobile device, a second signature recorded in a second signature entry location of a second multifunction mobile device, and a third signature recorded in a third signature entry location of a third multifunction mobile device,
 wherein each signature is displayed on the first, second, and third multifunction mobile devices,
 wherein each signature is used to sign a document in different places, and
 wherein signing is done in parallel or sequentially on separate screens amongst the three multifunction mobile devices such that the signatures are placed on a virtual document for interactive verification; wherein authentication is enabled by a finger print authentication mechanism; and wherein the mobile device accepts stylus input.

6. The system of claim 5, wherein the server synchronizes each signature in parallel or sequentially on two or more multifunction mobile phones such that the signatures are placed on a virtual document for interactive verification.

7. The system of claim 5, wherein each of the signatures recorded by a first multifunction mobile device and a second multifunction mobile device are viewable simultaneously.

8. The system of claim 7, wherein a touch sensitive keyboard is displayed in a window of the multifunction mobile device.

9. The system of claim 8, wherein the multifunction mobile device further comprises a eye print authentication mechanism.

10. A method for recording one or more signatures, comprising:
 recording a first signature in a first signature entry location displayed on a first mobile device, a second signature in a second signature entry location displayed on a second mobile device, and a third signature in a third signature entry location displayed on a third mobile device;

displaying a document on the first, second, and third mobile devices;

receiving on a server from the first, second, and third mobile devices, each of the signatures associated with the document, wherein each signature is used to sign the document in different locations; and synchronizing signatures between the three mobile devices and the server, wherein signing is done in parallel or sequentially on separate screens amongst the three multifunction mobile devices such that the signatures are placed on a virtual document for interactive verification.

11. The method of claim 10, wherein at least one mobile device comprises one or more processors, a touch screen display, a keyboard, a memory, a wireless transmit and receive unit, and is capable of voice and audio functions.

12. The method of claim 11, wherein the server is configured to receive each of the signatures from two or more mobile devices.

13. The method of claim 12, wherein the server is configured to synchronize each signature in parallel or sequentially on the two or more mobile devices such that the signatures are placed on a virtual document for interactive verification.

14. The method of claim 10, wherein each of the signatures recorded by two or more mobile devices are viewable simultaneously.

15. The method of claim 10, wherein a mobile device further comprises a finger print authentication mechanism.

16. The method of claim 15, wherein at least one mobile device is configured to accept a pen based input.

17. The method of claim 16, wherein at least one mobile device is configured for language translation.

18. The system of claim 17, wherein at least mobile device is configured for handwriting recognition.

19. The system of claim 18, wherein the server manages delivery of a function and maintains a history.

20. The system of claim 10, wherein a keyboard is displayed in a window of a first mobile device, wherein a screen is touch sensitive, and wherein a user may type on the screen as if it were a keyboard.

* * * * *